United States Patent
Schwartz et al.

(10) Patent No.: US 10,126,861 B2
(45) Date of Patent: Nov. 13, 2018

(54) FORCE SENSOR SUBSTRATE

(71) Applicant: SYNAPTICS INCORPORATED, San Jose, CA (US)

(72) Inventors: Adam L. Schwartz, Redwood City, CA (US); Hsiao-Lan Hsu, Taipei (TW); Chieh-Feng Tu, Taipei (TW)

(73) Assignee: SYNAPTICS INCORPORATED, San Jose, CA (US)

( * ) Notice: Subject to any disclaimer, the term of this patent is extended or adjusted under 35 U.S.C. 154(b) by 44 days.

(21) Appl. No.: 15/135,505

(22) Filed: Apr. 21, 2016

(65) Prior Publication Data

US 2016/0328079 A1 Nov. 10, 2016

Related U.S. Application Data

(60) Provisional application No. 62/159,205, filed on May 8, 2015.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0414* (2013.01); *G06F 2203/04105* (2013.01)

(58) Field of Classification Search
CPC .................................................. G06F 3/0414
See application file for complete search history.

(56) References Cited

U.S. PATENT DOCUMENTS

| | | |
|---|---|---|
| 5,510,813 A | 4/1996 | Makinwa et al. |
| 5,854,625 A | 12/1998 | Frisch et al. |
| 5,942,733 A | 8/1999 | Allen et al. |
| 5,973,668 A | 10/1999 | Watanabe |
| 6,002,389 A | 12/1999 | Kasser |
| 6,888,537 B2 | 5/2005 | Benson et al. |
| 6,958,614 B2 | 10/2005 | Morimoto |
| 7,047,818 B2 | 5/2006 | Dallenbach et al. |

(Continued)

FOREIGN PATENT DOCUMENTS

| | | |
|---|---|---|
| EP | 0467562 A2 | 1/1992 |
| EP | 2629075 A1 | 8/2013 |

(Continued)

*Primary Examiner* — Priyank Shah
(74) *Attorney, Agent, or Firm* — Patterson + Sheridan, LLP

(57) ABSTRACT

A force-sensitive input device and related method and processing system are disclosed. The input device comprises a first substrate mounted to a housing and defining a touch surface extending along first and second dimensions. The input device further comprises a second substrate disposed within the housing on a side of the first substrate opposite the touch surface. The second substrate comprises a first sensor electrode disposed along a periphery of the touch surface in the first and second dimensions, and a second sensor electrode disposed along the periphery of the touch surface and at least partly circumscribing the first sensor electrode in the first and second dimensions. The input device further comprises a processing system configured to perform capacitive sensing using the first and second sensor electrodes to determine a deflection of the first substrate relative to the housing in response to force applied to the touch surface.

21 Claims, 12 Drawing Sheets

(56) References Cited

U.S. PATENT DOCUMENTS

| | | |
|---|---|---|
| 7,148,882 B2 | 12/2006 | Kamrath et al. |
| 7,186,694 B2 | 3/2007 | Grasso et al. |
| 7,398,587 B2 | 7/2008 | Morimoto |
| 7,451,659 B2 | 11/2008 | Dallenbach et al. |
| 7,499,040 B2 | 3/2009 | Zadesky et al. |
| 7,656,465 B2 | 2/2010 | Takeda et al. |
| 7,728,487 B2 | 6/2010 | Adachi et al. |
| 7,743,667 B2 | 6/2010 | Harish et al. |
| 7,784,366 B2 | 8/2010 | Daverman et al. |
| 7,903,091 B2 | 3/2011 | Lee et al. |
| 8,120,229 B2 | 2/2012 | Huang |
| 8,169,416 B2 | 5/2012 | Han |
| 8,698,769 B2 | 4/2014 | Coulson et al. |
| 9,024,907 B2 | 5/2015 | Bolender |
| 2002/0180710 A1 | 12/2002 | Roberts |
| 2003/0151589 A1 | 8/2003 | Bensen et al. |
| 2004/0112149 A1 | 6/2004 | Gebert |
| 2004/0155991 A1 | 8/2004 | Lowles et al. |
| 2004/0227736 A1 | 11/2004 | Kamrath et al. |
| 2005/0052425 A1 | 3/2005 | Zadesky et al. |
| 2005/0057266 A1 | 3/2005 | Morimoto |
| 2005/0057528 A1 | 3/2005 | Kleen |
| 2005/0061082 A1 | 3/2005 | Dallenbach et al. |
| 2006/0017701 A1 | 1/2006 | Marten et al. |
| 2006/0197753 A1 | 9/2006 | Hotelling |
| 2006/0279548 A1* | 12/2006 | Geaghan ............... G06F 3/0416 345/173 |
| 2007/0063982 A1 | 3/2007 | Tran |
| 2007/0229464 A1 | 10/2007 | Hotelling et al. |
| 2007/0229470 A1 | 10/2007 | Snyder et al. |
| 2007/0236450 A1 | 10/2007 | Colgate et al. |
| 2007/0257821 A1 | 11/2007 | Son et al. |
| 2007/0268265 A1 | 11/2007 | XiaoPing |
| 2008/0018611 A1 | 1/2008 | Serban et al. |
| 2008/0062148 A1 | 3/2008 | Hotelling et al. |
| 2008/0068348 A1 | 3/2008 | Rosenberg et al. |
| 2008/0142352 A1 | 6/2008 | Wright |
| 2008/0190210 A1 | 8/2008 | Harish et al. |
| 2008/0202251 A1 | 8/2008 | Serban et al. |
| 2008/0202824 A1 | 8/2008 | Philipp et al. |
| 2009/0002328 A1 | 1/2009 | Ullrich et al. |
| 2009/0160682 A1 | 6/2009 | Bolender et al. |
| 2009/0160763 A1 | 6/2009 | Cauwels et al. |
| 2009/0167704 A1 | 7/2009 | Terlizzi et al. |
| 2009/0243817 A1 | 10/2009 | Son |
| 2010/0024573 A1* | 2/2010 | Daverman ............. G01L 1/142 73/862.626 |
| 2010/0026664 A1 | 2/2010 | Geaghan |
| 2010/0033354 A1 | 2/2010 | Ejlersen |
| 2010/0079384 A1 | 4/2010 | Grivna |
| 2010/0090813 A1 | 4/2010 | Je et al. |
| 2010/0107770 A1 | 5/2010 | Serban et al. |
| 2010/0108409 A1 | 5/2010 | Tanaka et al. |
| 2010/0149128 A1 | 6/2010 | No et al. |
| 2010/0156814 A1 | 6/2010 | Weber et al. |
| 2010/0250071 A1 | 9/2010 | Pala et al. |
| 2010/0253645 A1* | 10/2010 | Bolender ............. G06F 3/0414 345/174 |
| 2011/0005845 A1 | 1/2011 | Hotelling et al. |
| 2011/0023631 A1* | 2/2011 | Sleeman .............. G01L 1/146 73/862.626 |
| 2011/0025631 A1* | 2/2011 | Han .................... G06F 3/0414 345/173 |
| 2011/0057904 A1* | 3/2011 | Yamano ............... G06F 3/0414 345/174 |
| 2011/0141053 A1* | 6/2011 | Bulea .................. G06F 3/0416 345/174 |
| 2011/0148811 A1 | 6/2011 | Kanehira et al. |
| 2011/0175844 A1 | 7/2011 | Berggren |
| 2011/0278078 A1* | 11/2011 | Schediwy .............. G01L 1/146 178/18.06 |
| 2012/0075243 A1* | 3/2012 | Doi ..................... G06F 3/0416 345/174 |
| 2012/0090902 A1 | 4/2012 | Liu et al. |
| 2012/0098783 A1 | 4/2012 | Badaye et al. |
| 2012/0105333 A1 | 5/2012 | Maschmeyer et al. |
| 2012/0242610 A1 | 9/2012 | Yasumatsu |
| 2013/0009905 A1* | 1/2013 | Castillo ................ G06F 3/044 345/174 |
| 2013/0155059 A1* | 6/2013 | Wang ................... G06F 3/041 345/419 |
| 2013/0181928 A1* | 7/2013 | Li ....................... G06F 3/0414 345/173 |
| 2013/0234968 A1 | 9/2013 | Yanagi et al. |
| 2014/0002113 A1* | 1/2014 | Schediwy ............. G06F 3/044 324/661 |
| 2014/0043289 A1* | 2/2014 | Stern ................... G06F 3/044 345/174 |
| 2015/0268827 A1* | 9/2015 | Kim .................... G06F 3/04845 715/846 |
| 2015/0370376 A1* | 12/2015 | Harley ................. G06F 3/0414 345/174 |
| 2016/0098131 A1* | 4/2016 | Ogata .................. G06F 1/1643 345/173 |

FOREIGN PATENT DOCUMENTS

| | | |
|---|---|---|
| WO | WO-1997018528 A1 | 5/1997 |
| WO | WO2005121729 A1 | 12/2005 |
| WO | WO-2001098171 A2 | 8/2007 |
| WO | WO-2009157614 A1 | 12/2009 |
| WO | WO-2010018889 A1 | 2/2010 |
| WO | WO-2011156447 A1 | 12/2011 |
| WO | WO-201377322 A1 | 11/2013 |
| WO | WO-20150106183 A1 | 7/2015 |

* cited by examiner

FORCE SENSOR SUBSTRATE

CROSS-REFERENCE TO RELATED APPLICATIONS

This application claims benefit of U.S. provisional patent application Ser. No. 62/159,205, filed May 8, 2015 entitled "Force Sensor," which is herein incorporated by reference.

BACKGROUND

Field

Embodiments of the present invention generally relate to techniques for operating an input device having a display device with an integrated sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device comprising a first substrate mounted to a housing, the first substrate defining a touch surface extending along first and second dimensions. The input device further comprises a second substrate disposed within the housing on a side of the first substrate opposite the touch surface. The second substrate comprises a first sensor electrode disposed along a periphery of the touch surface in the first and second dimensions, and a second sensor electrode disposed along the periphery of the touch surface and at least partly circumscribing the first sensor electrode in the first and second dimensions. The input device further comprises a processing system configured to perform capacitive sensing using the first and second sensor electrodes to determine a deflection of the first substrate relative to the housing in response to force applied to the touch surface.

Another embodiment described herein is a method of operating a force-sensitive input device comprising a substrate disposed on a non-viewing side of a display, the display mounted to a housing and having a first surface extending along first and second dimensions. The method comprises driving, during a first time period, a first sensor electrode of the substrate with a first sensing signal, the first sensor electrode disposed along a periphery of the first surface in the first and second dimensions. The method further comprises driving, during the first time period, a second sensor electrode of the substrate with a guard signal, the second sensor electrode disposed along the periphery of the first surface and at least partly circumscribing the first sensor electrode in the first and second dimensions. The method further comprises receiving, using the first sensor electrode, a first resulting signal comprising effects of the driven first sensing signal and effects of a first deflection of the display relative to the housing. The method further comprises determining, based on the received first resulting signal, a first force applied to the first surface, and performing, using the display, a first user interface action based on the first force.

Another embodiment described herein is a processing system for a force-sensitive input device comprising a substrate disposed on a non-viewing side of a display, the display mounted to a housing and having a first surface extending along first and second dimensions. The processing system comprises a force sensing module communicatively coupled with first and second sensor electrodes of the substrate. The force sensing module is configured to drive, during a first time period, the first sensor electrode with a first sensing signal, the first sensor electrode disposed along a periphery of the first surface in the first and second dimensions. The force sensing module is further configured to drive, during the first time period, the second sensor electrode with a guard signal, the second sensor electrode disposed along the periphery of the first surface and at least partly circumscribing the first sensor electrode in the first and second dimensions. The force sensing module is further configured to receive, using the first sensor electrode, a first resulting signal comprising effects of the driven first sensing signal and effects of a first deflection of the display relative to the housing. The force sensing module is further configured to determine, based on the received first resulting signal, a first force applied to the first surface, and perform, using the display, a first user interface action based on the first force.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
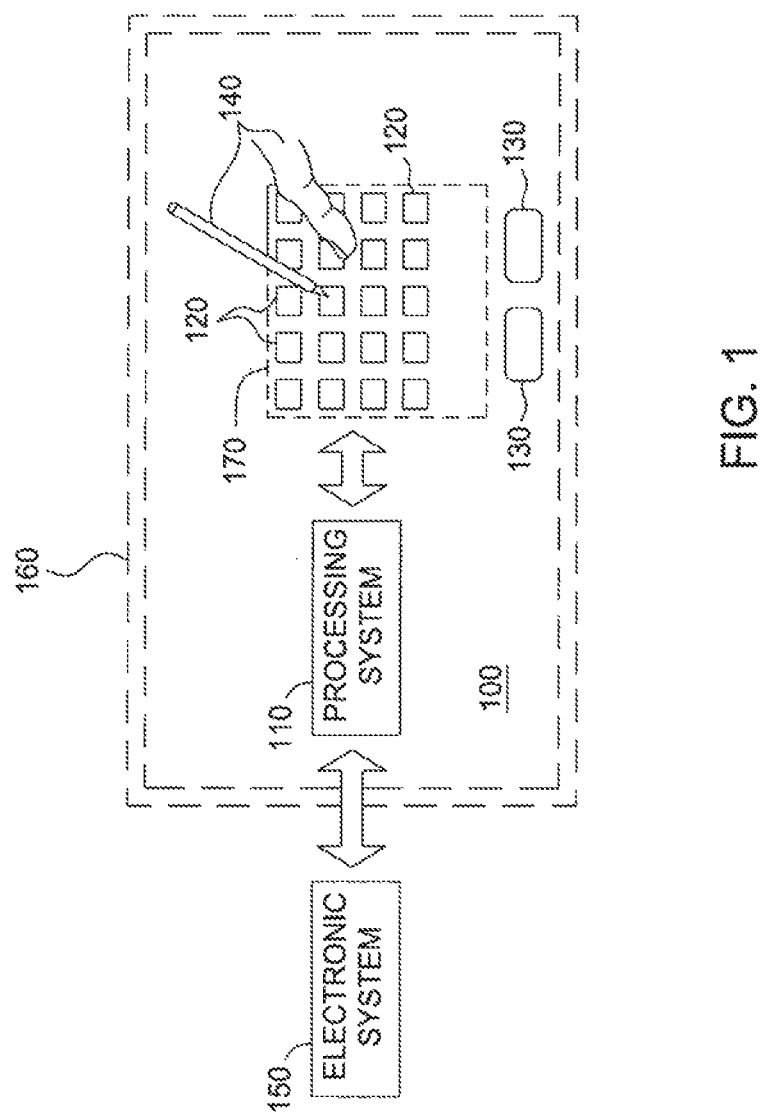
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger).

Within an input device, force sensing information can be combined with touch (or proximity) sensing information to estimate applied force at one or more touch locations providing users a more robust, intuitive, and effective input. However, conventional force sensor implementations can be costly in terms of additional circuitry and routing considerations.

According to various embodiments described herein, an input device comprises a first substrate mounted to a housing and defining a touch surface extending along first and second dimensions. In some cases, the first substrate is included in a display mounted to the housing. The input device further comprises a second substrate disposed within the housing on a side of the first substrate opposite the touch surface. In some cases, the side of the first substrate opposite the touch surface represents a non-viewing side of the display. The second substrate comprises a first sensor electrode disposed along a periphery of the touch surface in the first and second dimensions, and a second sensor electrode disposed along the periphery of the touch surface and at least partly circumscribing the first sensor electrode in the first and second dimensions. A processing system is configured to operate the first and second sensor electrodes in one or both of an absolute capacitive sensing mode and a transcapacitive sensing mode. The second substrate may comprise additional sensor electrodes and or conductive traces that are driven or otherwise controlled by the processing system to perform guarding or shielding functions. Additionally, location compensation may be applied to the force measurement in order to provide a more uniform force response across the input surface of the Input device.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or Irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional Information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial Information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen Interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Arrangements

Figure 2:
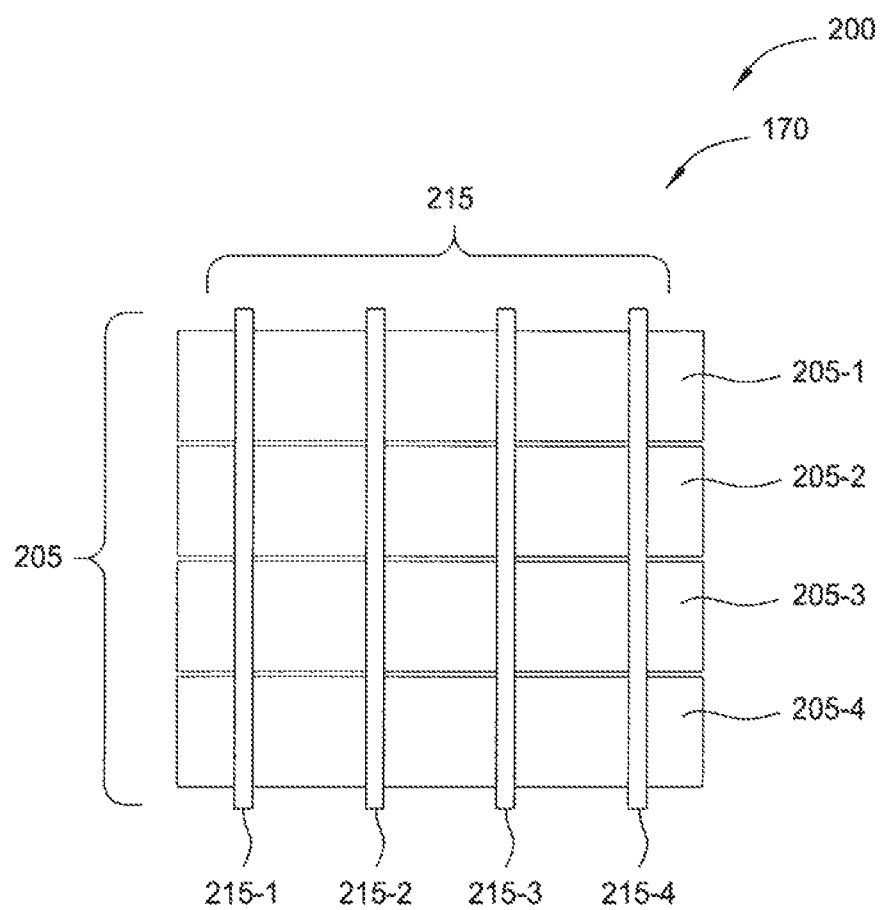
FIGS. 2 and 3 illustrate portions of exemplary sensor electrode arrangements, according to embodiments described herein.
Figure 3:
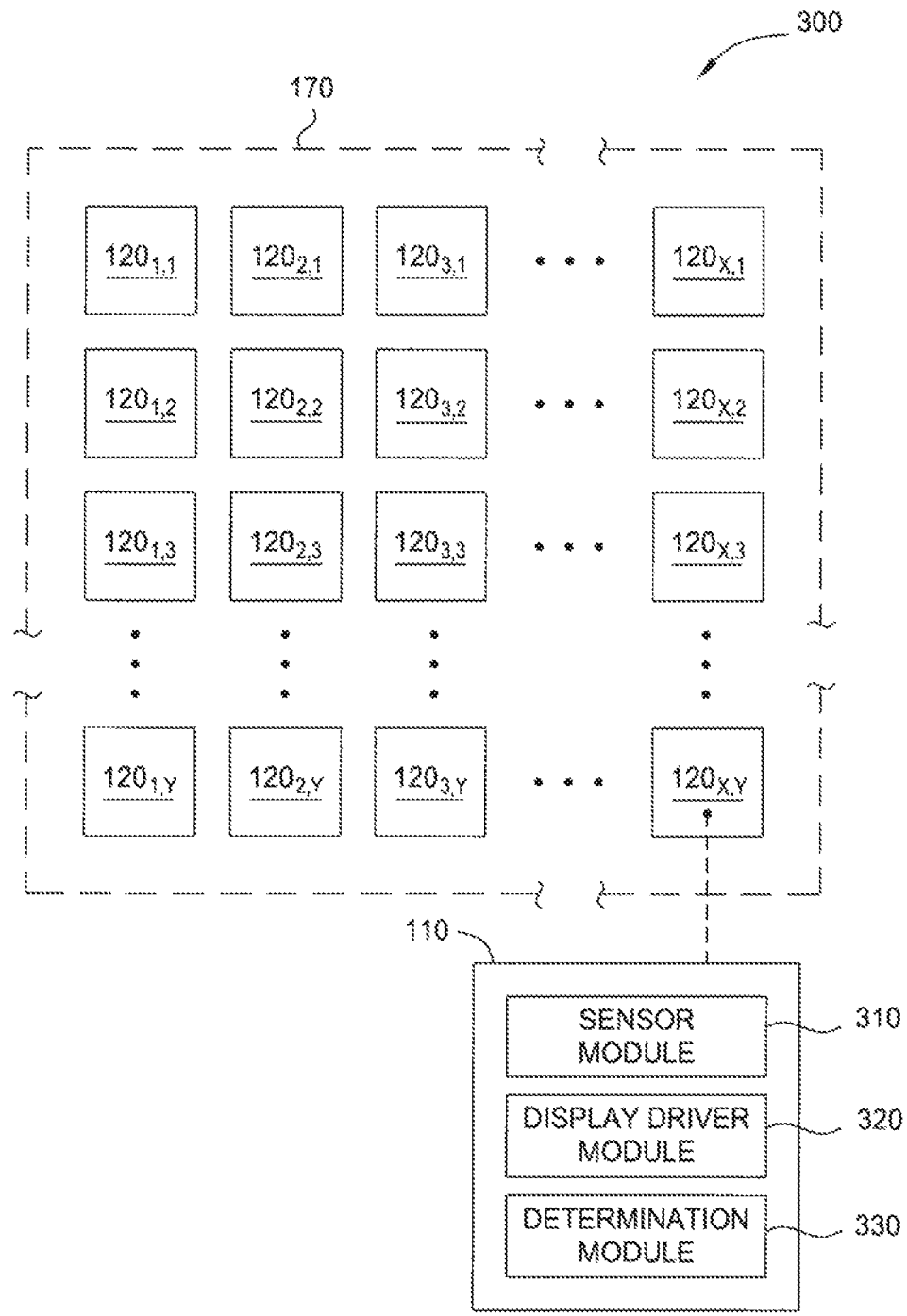

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of Illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, ..., $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, ..., $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object Is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display driver module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module 330 or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensor module 310 (i.e., transmitter module and/or receiver module). In another embodiment, the processing system 110 comprises a first integrated controller comprising the display driver module 320 and a second integrated controller comprising the sensor module 310. In yet another embodiment, the processing system comprises a first integrated controller comprising display driver module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Force Sensing Arrangements

Figure 4:
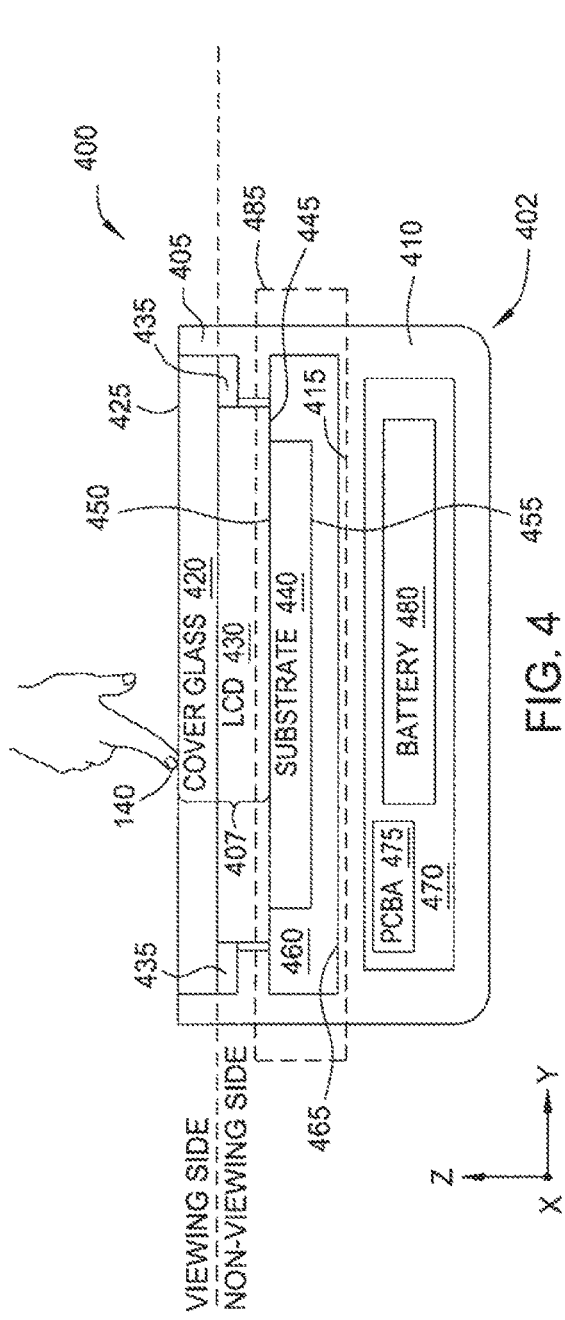
FIG. 4 illustrates an exemplary device including a force sensor substrate mounted to a display, according to embodiments described herein.

FIG. 4 illustrates an exemplary device including a display and a force sensor, according to embodiments described herein. Specifically, FIG. 4 illustrates a cross-sectional view of an exemplary device 400. Some non-limiting examples of device 400 include a smartphone, tablet, and other mobile computing devices. The components of device 400 are not drawn to scale.

Device 400 includes a housing 402 configured to support and/or retain a display assembly 407 (or "display") within the device 400. In some embodiments, the housing 402 comprises a bezel member 405 that at least partially circumscribes the display 407. The bezel member 405 may have any suitable shape for circumscribing the display 407. In another embodiment, the bezel member 405 is formed from multiple members that when connected circumscribe the display 407.

The display 407 may be seated against and/or attached with one or more surfaces of the bezel member 405, such as a vertical portion (i.e., aligned along the Z-direction) and a horizontal portion (I.e., aligned along the X and/or Y-directions). In some embodiments, the display 407 is attached with a horizontal portion of the bezel member 405 through one or more spacer members 435. The housing 402 further includes a rear cover 410. In one embodiment, and as shown, the bezel member 405 and rear cover 410 of housing 402 are formed as a single component. The attached or integrated combination of the bezel member 405 with rear cover 410, and seating the display assembly 407 against the bezel member 405, operates to enclose other components of the device 400 and generally provides the appearance of a fully assembled device 400.

As shown, a frame member 415 extends along the X-Y plane and is disposed between bezel member 405 and rear cover 410. The frame member 415 may provide additional rigidity to the assembled device 400, provide additional coupling points for physical attachment to components of the device 400, etc. The frame member 415 may have a substantially continuous planar shape, or may define one or more openings through which wiring extends to connect components on opposing sides of the frame member 415. The frame member 415 may be fully or partially constructed from metallic materials. In some embodiments, frame member 415 includes a galvanic connection with ground or another voltage reference.

The display 407 includes separate layers (or substrates) for cover glass 420 and for LCD 430. It will be noted that a number of other suitable display architectures may be used as an alternative to LCD 430. For simplicity, other display-related layers or substrates are not shown. Further, in some embodiments, the display 407 includes a plurality of sensor electrodes within one or more layers of the display 407 that are configured to perform touch sensing relative to an input surface 425 of the device 400. As discussed above with respect to FIGS. 1-3, the plurality of sensor electrodes may be included on one or more substrates and disposed on a viewing side of the display 407.

Figure 5:
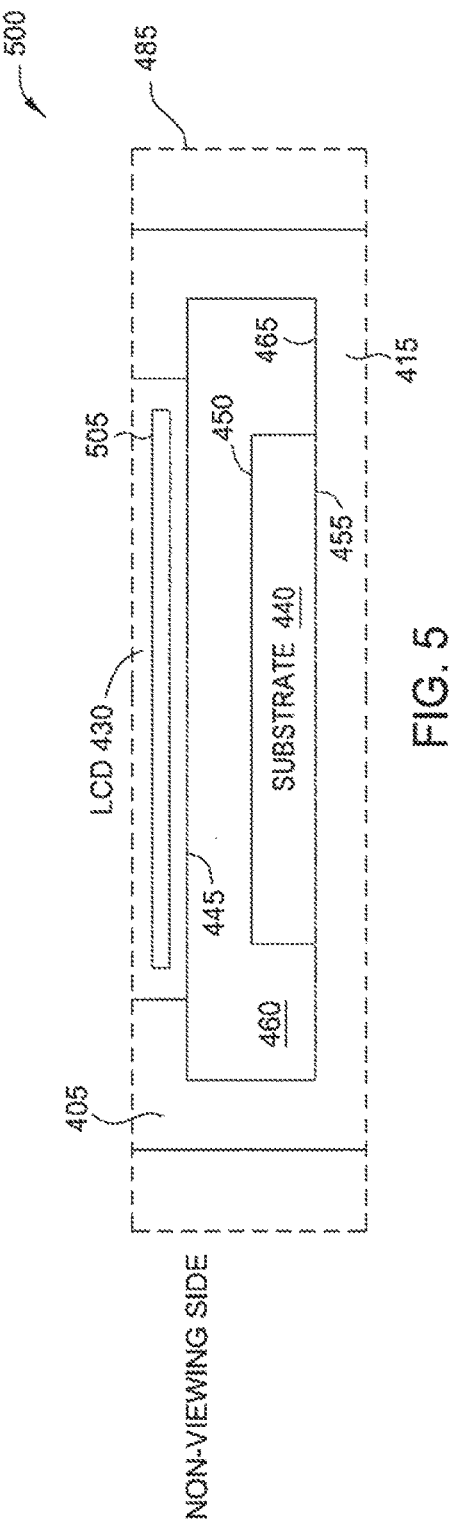
FIG. 5 illustrates an exemplary device including a force sensor substrate mounted to a housing, according to embodiments described herein.

A bottom surface 445 of the LCD 430, a top surface 465 of the frame member 415, and portions of the bezel member 405 define a first volume 460. The first volume 460 may be an air gap or include other dielectric material (e.g., a gel or foam) suitable for capacitance measurements for the force sensor 440. In some embodiments, a force sensor substrate 440 ("substrate 440") is disposed on a non-viewing side of the display 407 and at least partly within the first volume 460. As shown, the force sensor substrate 440 is coupled with the LCD 430. Generally, force sensor substrate 440 includes one or more electrodes that are configured to be driven, and the resulting signals can be measured to determine an amount of applied force. When force is applied to an input surface 425 (e.g., an input object 140 pressing cover glass 420 in the negative Z-direction), the display 407 deflects downward (due to a bending of the cover glass 420 and/or a compression of the spacer members 435 or adhesive coupling the cover glass 420 with the bezel member 405), causing the force sensor substrate 440 to displace within the first volume 460. Generally, the displacement causes a change in capacitance between electrode(s) within the force sensor substrate 440 and with the frame member 415. The change in capacitance may be measured and used to determine the amount of force applied to the input surface 425. An alternate embodiment of the device 400, particularly a section 485 of the device 400 including the first volume 460, is shown in FIG. 5.

A bottom surface of the frame member 415 and surfaces of the rear cover 410 define a second volume 470 within the device 400. In some embodiments, a printed circuit board assembly (PCBA) 475 and a battery 480 are disposed within the second volume 470. Although not shown, the PCBA 475 and/or battery 480 may be mounted on one or more structural components included within second volume 470. The PCBA 475 is generally powered by the battery 480 and generally includes some or all of the processing system 110 (e.g., sensor module 310, display driver module 320, and/or determination module 330 shown in FIG. 3).

In other embodiments, the force sensor 440 is disposed in alternate locations on the non-viewing side of the display 407 within the first volume 460. One non-limiting example is shown in FIG. 5, where arrangement 500 corresponds to section 485 of device 400. In arrangement 500, the force sensor substrate 440 is mounted on the frame member 415. In alternate embodiments having a dielectric material disposed within the first volume 460, the force sensor substrate 440 may be disposed on or within the dielectric material without being mounted on the display 407 and/or frame member 415.

In arrangement 500, capacitance is measured based on one or more conductive layers 505 within the LCD 430. In some embodiments, the conductive layer 505 may represent a common electrode (VCOM) layer of the LCD 430. The conductive layer 505 may include alternate layers comprising display electrodes and/or sensor electrodes. In some embodiments, the conductive layer 505 is coupled with a reference voltage, such as ground or a power supply rail.

Figure 6A:
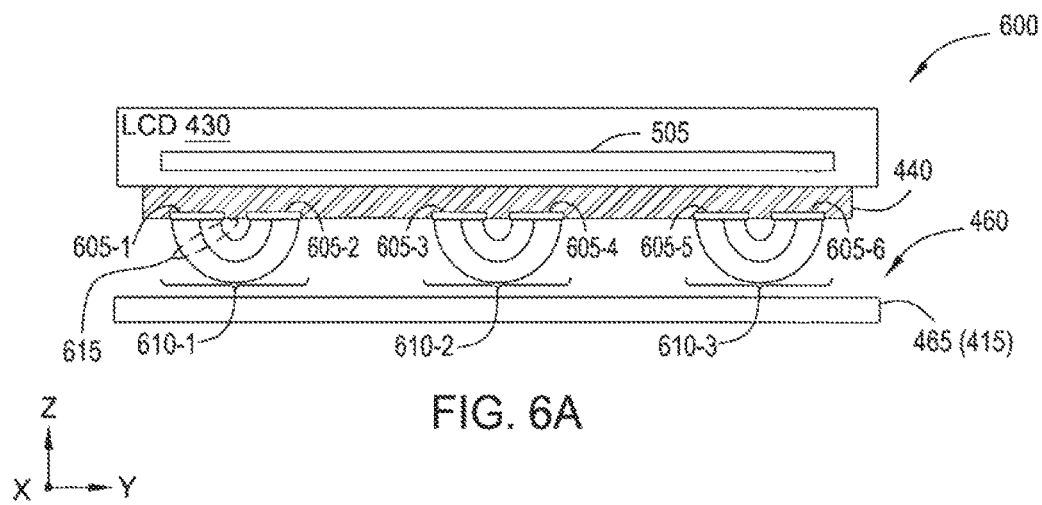
FIGS. 6A-6C illustrate the operation of exemplary implementations of a force sensor substrate coupled with a display, according to embodiments described herein.
Figure 6B:
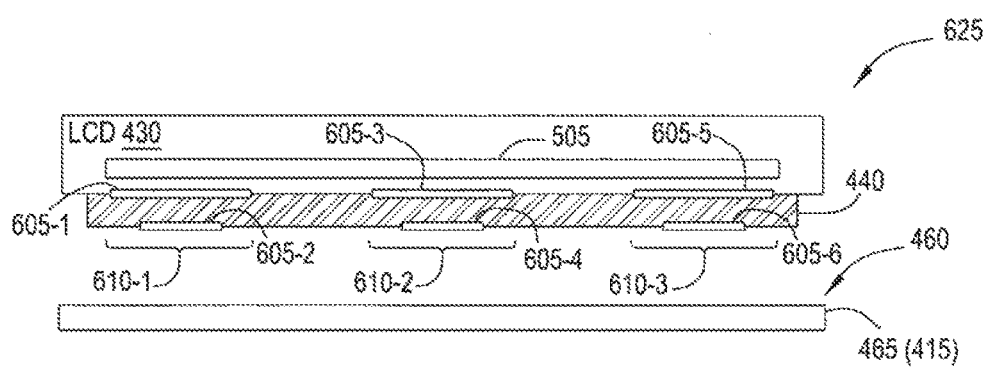
Figure 6C:
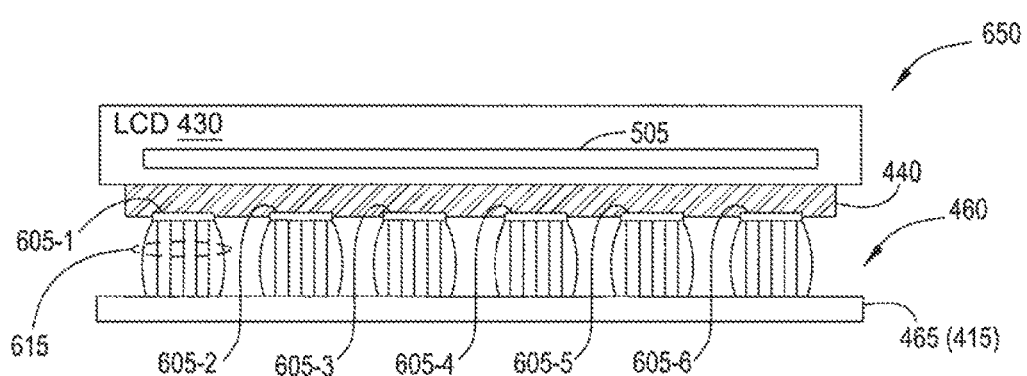

FIGS. 6A-6C illustrate the operation of exemplary implementations of a force sensor substrate coupled with a display, according to embodiments described herein. Specifically, arrangements 600, 625 illustrate exemplary transcapacitive implementations of force sensor substrate 440, and arrangement 625 illustrates an exemplary absolute capacitance implementation of force sensor substrate 440.

The force sensor substrate 440 includes a plurality of sensor electrodes 605-1, 605-2, . . . , 605-6 having any suitable arrangement. Any other number of sensor electrodes is possible. The sensor electrodes 605-1, 605-2, . . . , 605-6 may be arranged in a co-planar configuration (arrangements 600, 650) or distributed within multiple planes (arrangement 625). In arrangement 625, sensor electrodes included in each pair 610-1, 610-2, 610-3 have an overlapping orientation in the Z-direction.

Within each pair 610-1, 610-2, 610-3, one sensor electrode is configured to be operated as a transmitter electrode, and the other sensor electrode is configured to be operated as a receiver electrode. For example, sensor electrodes 605-1, 605-3, 605-5 are configured to be driven as transmitter electrodes, while sensor electrodes 605-2, 605-4, 605-6 are configured to receive resulting signals (Illustrated by electric field lines 615) comprising effects from the driven transmitter electrodes.

However, a top surface 465 of the frame member 415 causes a reduction to the amount of charge that is transferred between sensor electrodes in each pair 610-1, 610-2, 610-3 of sensor electrodes. The frame member 415 can be connected with ground or other voltage potential, but this is not a requirement. As the distance between frame member 415 and sensor electrodes 605-1, 605-2, . . . , 605-6 is decreased (e.g., during a press), the capacitive coupling between frame member 415 and sensor electrodes 605-1, 605-2, . . . , 605-6 increases and more charge is coupled into the frame member 415. The different amounts of charge coupled into the receiver electrodes can be measured and related to the amount of applied force.

Figure 7A:
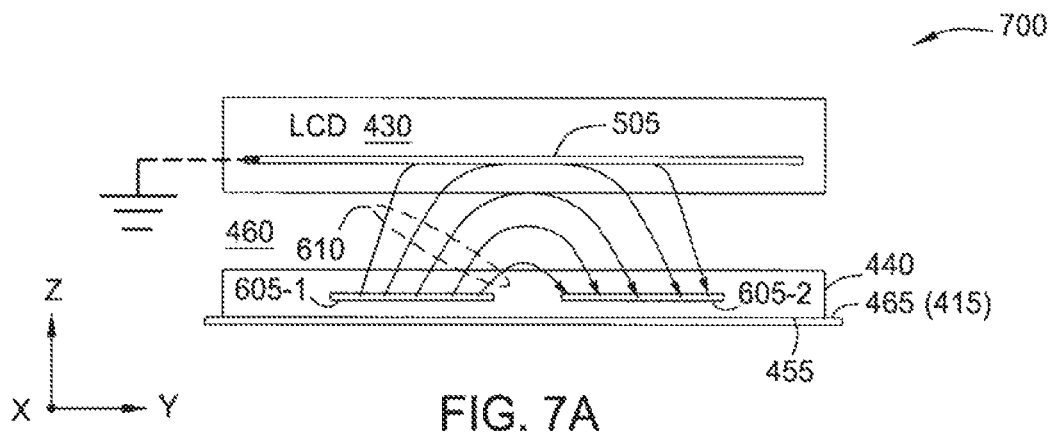
FIGS. 7A-7C illustrate the operation of exemplary implementations of a force sensor substrate coupled with a frame member, according to embodiments described herein.
Figure 7B:
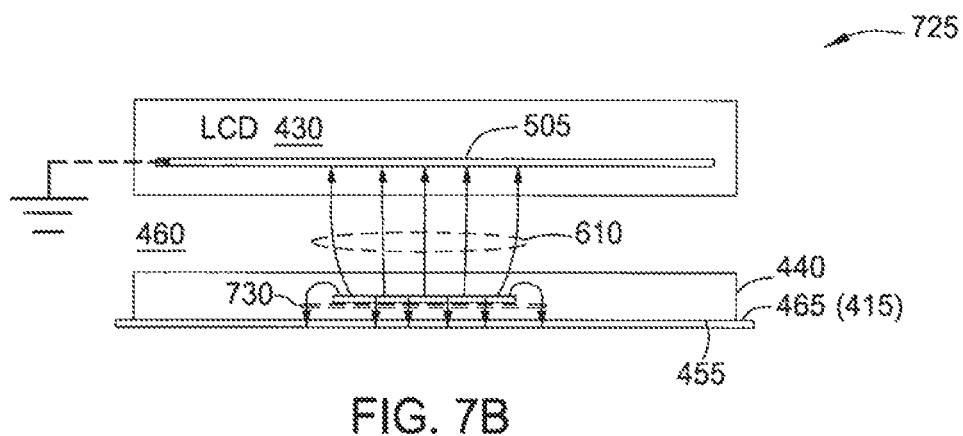
Figure 7C:
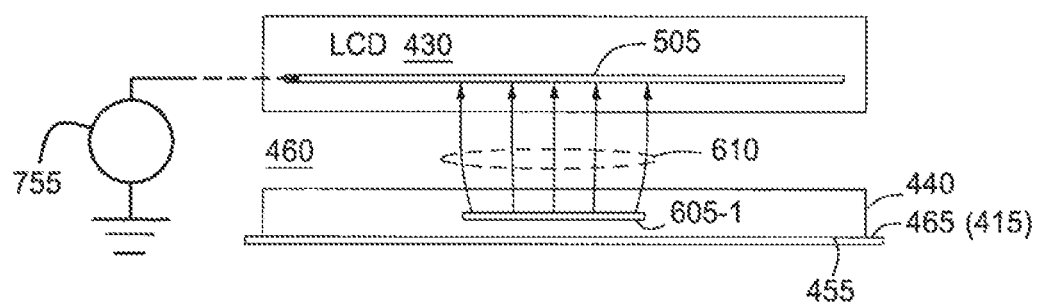

FIGS. 7A-7C illustrate the operation of exemplary implementations of a force sensor substrate coupled with a frame member, according to embodiments described herein. Specifically, arrangements 600, 625, and 650 illustrate the force sensor substrate 440 mounted on the frame member 415.

Arrangement 700 illustrates an exemplary transcapacitive implementation of force sensor substrate 440. The force sensor substrate 440 includes a plurality of sensor electrodes 605-1, 605-2 having any suitable arrangement. Although sensor electrodes 605-1, 605-2 are depicted as being included within the force sensor substrate 440, the sensor electrodes 605-1, 605-2 may have alternate dispositions, such as on one or more surfaces of the force sensor substrate 440. As shown, sensor electrode 605-1 is configured to be driven as a transmitter electrode, and sensor electrode 605-2 is configured to receive resulting signals (illustrated by electric field lines 610) comprising effects from the driven transmitter electrode. However, conductive layer 505 of the LCD 430 causes a reduction to the amount of charge that is transferred between the sensor electrodes 605-1 and 605-2. The conductive layer 505 in arrangement 700 is shown as connected with ground, but this is not a requirement. As the distance between conductive layer 505 and sensor electrodes 605-1, 605-2 is decreased (e.g., during a press), the capacitive coupling between conductive layer 505 and sensor electrodes 605-1, 605-2 increases and more charge is coupled into the conductive layer 505. The different amounts of charge coupled into the sensor electrode 605-2 can be measured and related to the amount of applied force.

Generally, the transcapacitive force sensing implementations of FIGS. 6A-6C and 7A-7C may be less sensitive to parasitic capacitances and other environmental factors when compared with an absolute capacitive sensing implementation. However, with sufficient applied force, the air gap of the first volume 460 may become very thin or may be eliminated entirely. As shown, when the air gap is eliminated the LCD 430 physically contacts the force sensor substrate 440. In other embodiments, another surface such as a conductive frame member physically contacts the force sensor substrate 440. If the air gap is eliminated and the grounding of the surface that contacts the force sensor substrate 440 is imperfect, charge will transfer from the transmitter electrode (e.g., sensor electrode 605-1) through the poorly grounded surface and into the receiver electrode (e.g., sensor electrode 605-2). Thus, the charge received at the sensor electrode 605-2 during a press may be reduced or in some cases can increase, affecting the accuracy of the resulting signals and potentially producing spurious results.

Arrangement 725 illustrates an exemplary absolute capacitance implementation of force sensor substrate 440. As shown, sensor electrode 605-1 is configured to be driven with a sensing signal, and is further configured to measure resulting signals comprising effects of the driven sensing signal. Generally, the capacitive couplings between sensor electrode 605-1 and the conductive layer 505 (shown by electric field lines 610) and the frame member 415 (shown by electric field lines 730) affect the amount of charge that is coupled away from the sensor electrode 605-1, which can be measured and related to the amount of applied force.

The effects of poor grounding, discussed above with respect to transcapacitive implementations, are largely mitigated by using an absolute capacitance scheme for at least a portion of the time. In an absolute capacitive scheme, the amount of charge coupled into a surface increases as the surface approaches the force sensor substrate 440; however, the amount of charge will not decrease. However, absolute capacitance measurements can vary due to factors other than the deflection of the force surface. Therefore, in some embodiments, the force sensor substrate 440 is configured to operate in a hybrid mode, where both absolute capacitance and transcapacitance techniques are used to measure force applied to the input surface.

Arrangement 750 shows an exemplary in-cell implementation of a force sensor substrate 440. In arrangement 750, the force sensor 440 measures a capacitive coupling with conductive layer 505 of the LCD 430 including electrodes used for display updating and/or capacitive touch sensing. In some embodiments, the conductive layer 505 comprises a VCOM layer (or "common electrode" layer). In some embodiments, the sensor electrodes are further used for sensing proximity of input objects at or above the input surface. In one embodiment, measurements on the sensor electrode 605-1 are performed during a non-display update period (such as a horizontal blanking period, vertical blanking period, long-horizontal blanking period, etc.). As a result, the sensor electrode 605-1 does not require shielding to prevent noise and unwanted coupling caused by the display updating process. For example, the VCOM layer is generally held at a constant voltage during display updating, and the VCOM layer is modulated with a sensing signal during sensing operations.

In implementations where the force sensor electrode is not mounted to the LCD 430, the sensor electrode 605-1 may be configured to measure a capacitive coupling with common electrodes of the LCD 430. The common electrodes may be driven with a sensing waveform when the measurement of sensor electrode 605-1 is performed. In such an embodiment, transcapacitance sensing avoids the signal inversion that can occur with poor grounding.

Exemplary Force Sensor Substrate Arrangements

Figure 8:
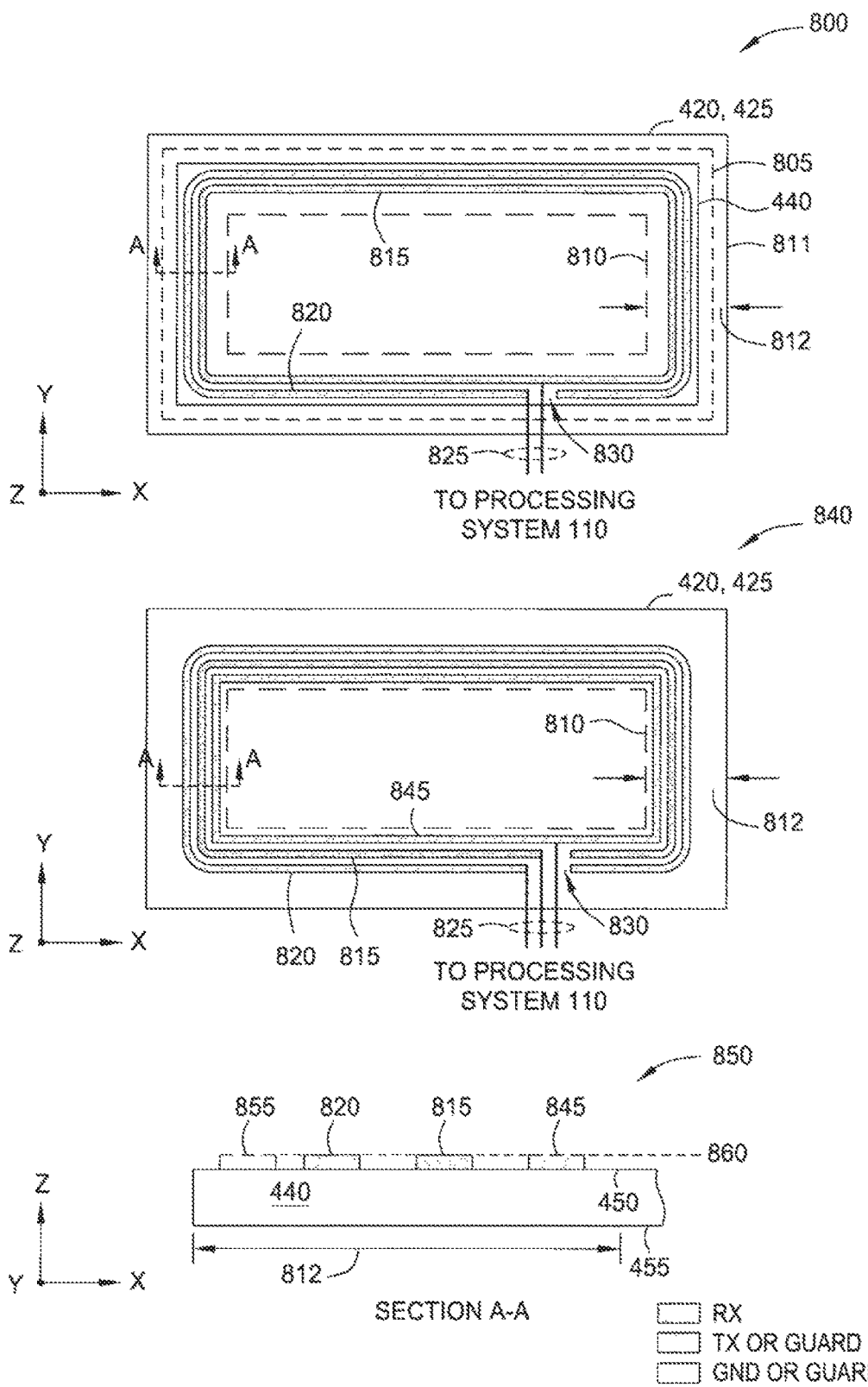
FIG. 8 illustrates exemplary single-layer sensor electrode arrangements for a force sensor substrate, according to embodiments described herein.

FIG. 8 illustrates exemplary single-layer sensor electrode arrangements for a force sensor substrate, according to embodiments described herein. More specifically, arrangements 800 and 840 correspond to exemplary layouts of sensor electrodes having a co-planar disposition on a force sensor substrate 440.

Arrangement 800 is shown in a top-down plan view. The disposition of the force sensor substrate 440 in the X-Y plane is shown relative to the first surface 425, which in some cases is defined by the extent of the cover glass 420. A dashed line represents an active area 805 of the display.

First and second sensor electrodes 815, 820 are included in the substrate 440, and are generally operated by processing system 110 to perform capacitive sensing to determine force input. Each of the first and second sensor electrodes 815, 820 is disposed around a periphery 812 of the first surface 425. In some embodiments, and as shown, the first and second sensor electrodes 815, 820 spatially overlap with the active area 805 in the X-Y plane, but this is not a requirement. As shown, each of the first and second sensor electrodes 815, 820 is formed in a substantially continuous pattern around the periphery 812. More complex arrangements of the first and second sensor electrodes 815, 820 are also possible, such as segmented patterns for the first and/or second sensor electrodes 815, 820.

The periphery 812 represents an outermost portion of the first surface 425. In some embodiments, the periphery 812 is defined between outer edge(s) 811 of the first surface 425 and an interior boundary 810. As discussed above, the sensing of force inputs at the first surface 425 may have reduced sensitivity closer to the outer edges 811 of the first surface 425, e.g., due to mechanical mounting of the cover glass 420 or other display components with structural members.

The periphery 812 may have any suitable dimensioning to include areas of reduced force sensitivity. In some embodiments, the extent of the periphery 812 in the X and Y-dimensions may be the same (e.g., forming a uniformly wide band around the first surface 425). In other embodiments, the extent of the periphery 812 can be based on other factors, such as the relative dimensions of the first surface 425, the location(s) of reduced and/or enhanced force sensitivity regions (e.g., based on the mechanical construction of the arrangement 800, and so forth. In one non-limiting example, the periphery 812 comprises less than about one-third (33%) of the extent in each dimension. For instance, for a first surface 425 extending approximately 6 inches in the X-dimension and 4 inches in the Y-dimension, the periphery 712 includes less than 2 inches in the X-dimension and less than 1.33 inches in the Y-dimension. Other values are possible.

The relative disposition of the first and second sensor electrodes 815, 820 within the periphery 812 may vary based on the desired sensitivity level of the force sensing, the location(s) of reduced and/or enhanced force sensitivity regions, and so forth. For example, placing the first and/or second sensor electrodes 815, 820 overlapping with an opening in the metal frame 465 (FIGS. 4, 5) could yield unacceptable force measurement performance across the entire first surface 425. Additionally, properties of the first and second sensor electrodes 815, 820 may be selected based on desired force sensitivity. Some non-limiting examples of selectable properties include dimensions (e.g., length and width), pattern, shape, and so forth.

In various embodiments described herein, the first sensor electrode 815 is at least partially circumscribed by the second sensor electrode 820 in the X-Y plane (i.e., in first and second dimensions). As shown in the co-planar configuration of arrangement 800, the first and second sensor electrodes 815, 820 do not overlap in the X-Y plane in order to maintain galvanic isolation. The first and second sensor electrodes 815, 820 are coupled with processing system 110 through one or more conductive traces 725. In cases where the conductive traces 825 are substantially co-planar with the first and/or second sensor electrodes 815, 820, the conductive traces 825 may be routed through one or more openings 830 formed in the first and/or second sensor electrodes 815, 820. Alternative embodiments for connecting the first and second sensor electrodes 815, 820 with the processing system 110 may include conductive vias extending through the force sensor substrate 440, jumpers, and so forth.

As shown, the first sensor electrode 815 is configured to be operated as a receiver electrode, and the second sensor electrode 820 is configured to be operated as a transmitter electrode for transcapacitive sensing and a guard electrode for absolute capacitive sensing. During absolute capacitive sensing operation, the first sensor electrode 815 is operated as a receiver electrode and the second sensor electrode 820 is operated as a guard electrode. The first sensor electrode 815 is driven with a first sensing signal during a time period, and the second sensor electrode 820 is operated as a guard electrode during the time period. During a subsequent time period, capacitance measurements are taken based on a resulting signal received at the first sensor electrode 815, the resulting signal comprising effects of the driven first sensing signal. Generally, the guard electrode is operated by being driven with a guard (or guarding) signal, which may be a varying voltage signal having at least one of a similar phase, frequency, and amplitude as the modulated signal driven onto the sensor electrodes (e.g., first sensor electrode 815). Driving the guard electrode contemporaneously with driving the first sensor electrode operates to reduce external effects (such as noise or parasitic capacitance to other conductive surfaces) on the capacitance measurements used for force sensing. Based on the relative disposition of the guard electrode relative to the first sensor electrode 815, operating the guard electrode thus tends to shape or orient a force sensitivity of the force sensor substrate 440 in at least the X and Y dimensions.

During transcapacitive sensing operation, the first sensor electrode 815 is operated as a receiver electrode and the second sensor electrode 820 is operated as a transmitter electrode. The second sensor electrode 820 is driven with a second sensing signal during a time period, and the first sensor electrode 815 receives a resulting signal comprising effects of the driven second sensing signal.

The illustrated arrangement 800 beneficially provides a zero-dimensional ("0D") force sensor substrate 440 having reduced complexity, requiring only two connections with the processing system 110. In one alternate embodiment, the force sensor substrate 440 may include a single sensor electrode 815 disposed along a periphery of the first surface 425, performing absolute capacitive sensing using a single connection with the processing system 110. In some cases, the few required connections can allow existing proximity sensing circuitry included in the processing system 110 to also receive force sensing Information (e.g., through as few as one or two pins of a proximity sensing IC); in this way, a dedicated force sensing IC would not be required.

In some embodiments, the force sensor substrate 440 includes more than two sensor electrodes 815, 820. Arrangement 840 is shown as a top-down plan view including first and second sensor electrodes 815, 820 as well as a third sensor electrode 745 disposed along the periphery 812 of the first surface 425 and configured to be operated as a transmitter electrode and a guard electrode. The third sensor electrode 845 is circumscribed by the first and second sensor electrodes 815, 820 in the X-Y plane. In some embodiments, the third sensor electrode 745 is operated with the same signals (e.g., a sensing signal or guard signal) as the second sensor electrode 820, whether the signals are independently driven or the second and third sensor electrodes 820, 845 are galvanically coupled. The operation of the second and third sensor electrodes 820, 845 on opposing sides of the first sensor electrode 815 generally improves capacitive sensing performance in either absolute capacitive sensing or transcapacitive sensing modes, coupling relatively more charge from the driven sensing signal into the first sensor electrode 815 and providing better shielding against parasitic capacitances to conductive surfaces which are not intended as part of the force measurement design and better shielding against noise.

FIG. 8 further includes a partial cross-sectional view 850 of the force sensing substrate 440 corresponding to section A-A of the arrangements 800, 840. As shown, the first, second and (optional) third sensor electrodes 815, 820, 845 have a co-planar arrangement indicated by line 860. The first, second and third sensor electrodes 815, 820, 845 are shown as being disposed on a top surface 450 of the force sensor substrate 440; alternative implementations may have other co-planar dispositions such as at a common layer within the force sensor substrate 440 or on the bottom surface 455.

Within the partial cross-sectional view 850, the force sensor substrate 440 also includes a conductive trace 855 configured to be coupled with ground and/or driven with a guard signal. Generally, the conductive trace 855 may correspond to one or more other conductive elements that are included within the force sensor substrate 440. In some cases, the conductive trace 855 may also be disposed along the periphery 812 and at least partially circumscribes the first, second, and/or third sensor electrodes 815, 820, 845. In some embodiments, when the processing system 110 operates the first, second, and third sensor electrodes 815, 820, 845 within a transcapacitive sensing mode, the conductive trace 755 provides shielding or guarding of the third sensor electrode 845 to mitigate undesired coupling with objects outside the sensing region.

The conductive trace 855 is shown as being disposed on top surface 450 of force sensor substrate 440 and co-planar with the first, second, and third sensor electrodes 815, 820, 845 along line 860, but this is not a requirement. In some embodiments, the first, second, and third sensor electrodes 815, 820, 845 are co-planar while the conductive trace 855 is arranged in a separate non-co-planar layer of the force sensor substrate 440.

Furthermore, any of the various single-layer implementations that are depicted in arrangements 800, 840 may be alternately implemented in multiple layers within substrate 440. In one non-limiting example, the second and/or third sensor electrodes 820, 845 are disposed on the bottom surface 455 of the force sensor substrate 440 while the first sensor electrode 815 is disposed on the top surface 450. Still further, in alternate embodiments, the processing system 110 is configured to operate the first, second, third sensor electrodes 815, 820, 845 and/or conductive trace 855 differently when performing absolute capacitive sensing and/or transcapacitive sensing. Any suitable operation of the first, second, third sensor electrodes 815, 820, 845 and conductive trace 855 is contemplated. In one non-limiting example using arrangement 840, the processing system 110 during absolute capacitive sensing alternately operates the third sensor electrode 845 as the receiver electrode and drives one or both of the first and second sensor electrodes 815, 820 with a guard signal. In another non-limiting example, multiple of the first, second, and third sensor electrodes 815, 820, 845 are operated as receiver electrodes. In some embodiments, the processing system 110 is configured to determine a best configuration for operating the first, second, and third sensor electrodes 815, 820, 845 for absolute capacitive sensing and/or transcapacitive sensing, e.g., based on measured noise. The processing system 110 in some cases may dynamically reconfigure operation of the first, second, and third sensor electrodes 815, 820, 845.

Figure 9:
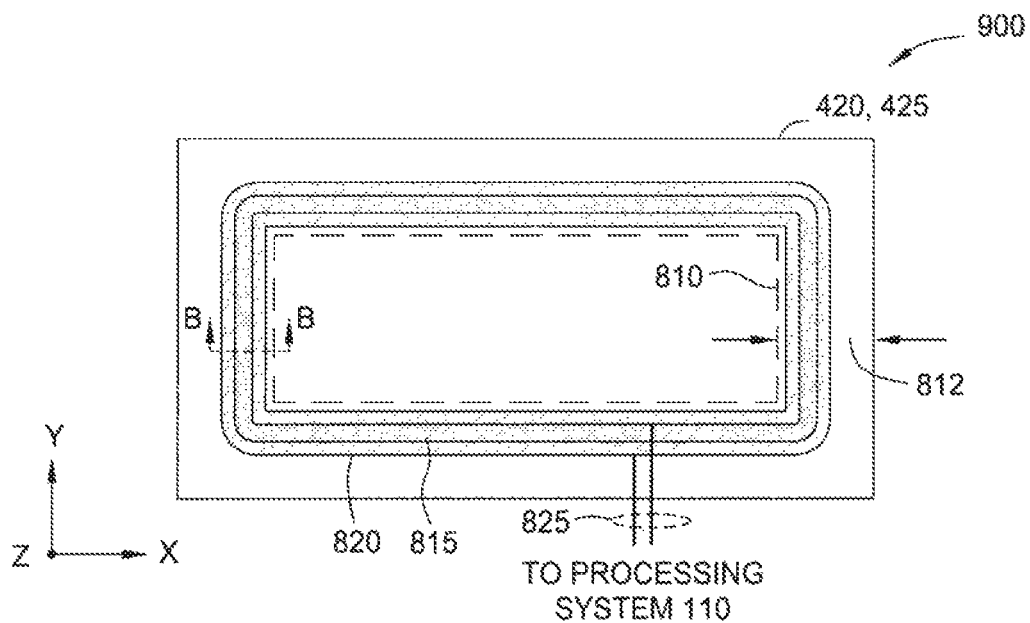
FIG. 9 illustrates exemplary multiple-layer sensor electrode arrangements for a force sensor substrate, according to embodiments described herein.
Figure 9:
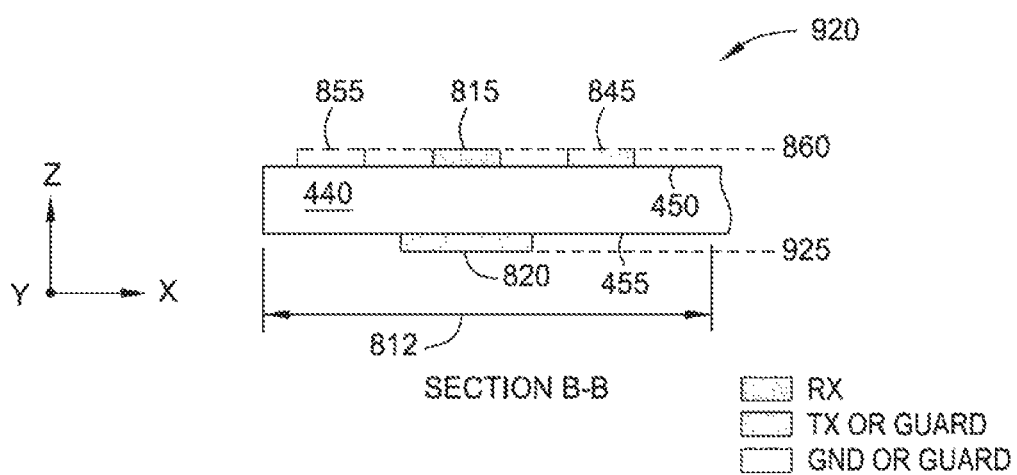

FIG. 9 illustrates exemplary multiple-layer sensor electrode arrangements for a force sensor substrate, according to embodiments described herein. In arrangement 900, the first and second sensor electrodes 815, 820 are included in the substrate 440, and are generally operated by processing system 110 to perform capacitive sensing to determine force input. Each of the first and second sensor electrodes 815, 820 is disposed around a periphery 812 of the first surface 425.

FIG. 9 further includes a partial cross-sectional view 920 of the force sensing substrate 440 corresponding to section B-B of the arrangement 900. As shown, the first sensor electrode 815 is disposed on the top surface 450 of force sensor substrate 440, and the second sensor electrode 820 is disposed on the bottom surface 455 of the force sensor substrate 440. The first and second sensor electrodes 815, 820 spatially overlap in the X-Y plane, which generally would not be possible for substantially continuous first and second sensor electrodes 815, 820 in single layer (co-planar) arrangements. As shown, along the periphery 812, the second sensor electrode 820 extends past the first sensor electrode in the positive and negative X-dimension and in the positive and negative Y-dimension. However, other amounts of overlap are possible, such as the second sensor electrode 820 extending partly or wholly beneath the first sensor electrode 815 in one dimension, but not extending beyond the first sensor electrode 815 in said dimension. For example, the second sensor electrode 820 extends beyond the first sensor electrode 815 in the negative X-dimension but does not extend beyond in the positive X-dimension. Similar to arrangement 840 in which a transmitter or guard electrode is disposed on opposing sides of the receiver electrode, having the second sensor electrode 820 at least partly overlapping with the first sensor electrode 815 (which can include extending beyond the first sensor electrode 815 in both positive and negative directions in a dimension) generally improves capacitive sensing performance in either absolute capacitive sensing or transcapacitive sensing modes.

The force sensing substrate 440 may further include a third sensor electrode 845 and/or conductive trace 855, the operation of which is discussed above. The third sensor electrode 845 and/or conductive trace 855 in some cases may be co-planar with the first sensor electrode 815 along line 760. In other cases, one or more of the third sensor electrode 845 and conductive trace 855 is co-planar with the second sensor electrode 820.

Figure 10:
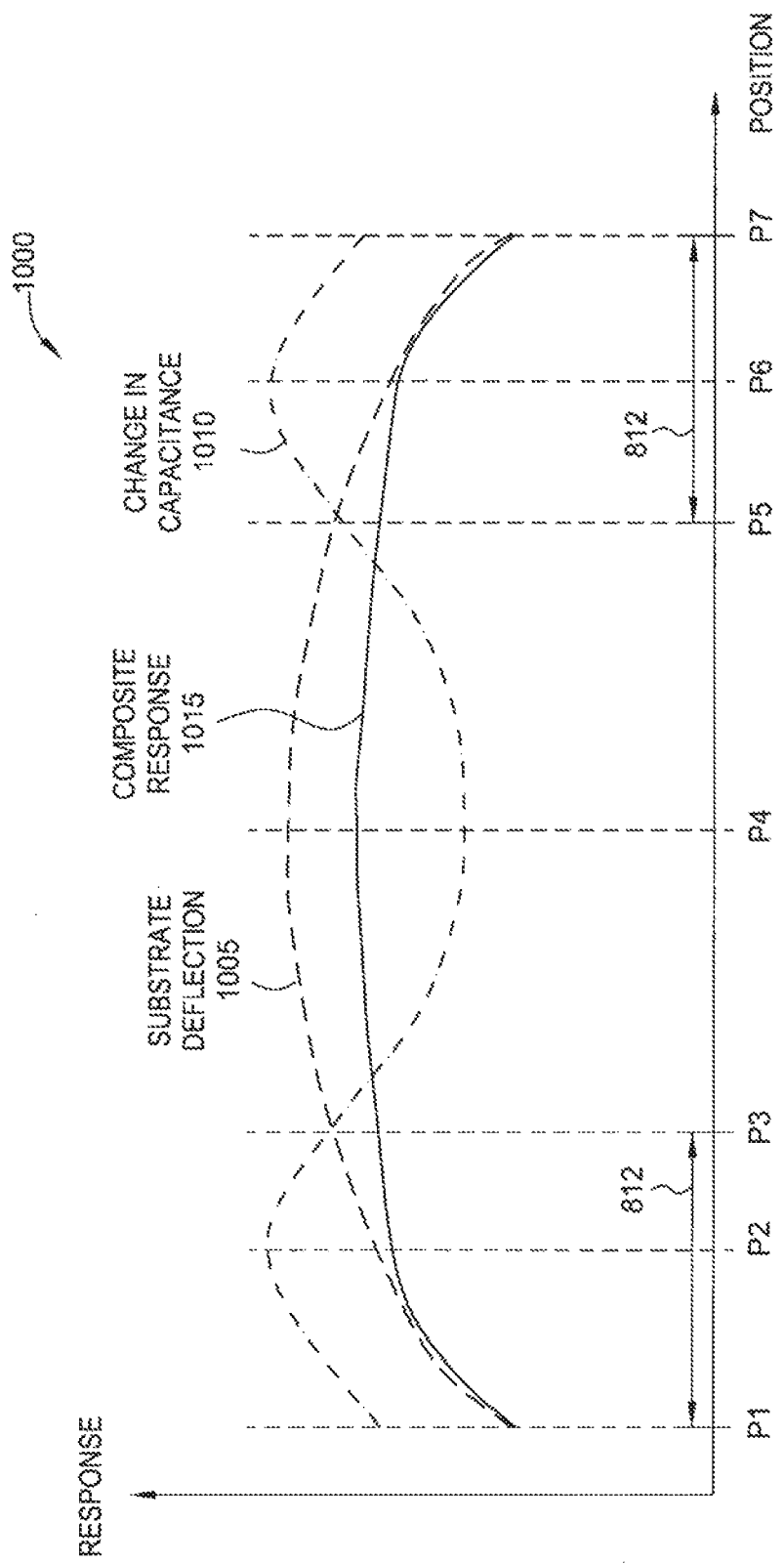
FIG. 10 is a graph illustrating responses of an exemplary force sensor substrate, according to embodiments described herein.

FIG. 10 is a graph illustrating responses of an exemplary force sensor substrate, according to embodiments described herein. The horizontal axis (Position) represents position values along a single dimension of a touch surface, such as the X or Y-dimensions shown in FIGS. 8 and 9. The vertical axis (Response) represents various response values. Although, for clarity, the response values are shown relative to a single dimension of the touch surface, note that the response values could be plotted relative to two dimensions (e.g., positions on the X-Y plane) of the touch surface.

Graph 1000 includes a substrate deflection plot 1005 representing a maximum physical deflection (response) of the substrate between position values P1 and P7. For the arrangements 800, 840, 900 shown in FIGS. 8 and 9, the position values P1 and P7 may represent left-most and right-most extents of the substrate along a particular dimension (e.g., in the X or Y-dimension) At position values P1 and P7, the substrate is mounted to a housing, e.g., a bezel member at least partially circumscribing the substrate. The value of substrate deflection plot 1005 at position values P1 and P7 is approximately zero. The maximum amount of substrate deflection gradually increases as values approach position value P5 at approximately a center position between position values P1 and P7. Thus, the physical responsiveness of the substrate at positions nearer to the position values P1 and P7 is less than positions nearer to the position value P5.

However, in various embodiments, the placement of sensor electrodes along the periphery 812 of the touch surface (as shown, between position values P1-P3 and P5-P7) tends to improve the localized capacitive response and thereby mitigates the reduced physical responsiveness of the substrate along the periphery. Assuming that sensor electrodes (e.g., a receiver electrode) are disposed near position values P2 and P6, a change in capacitance plot 1010 indicates relative peaks of capacitive responsiveness occurring near the position values P2 and P8.

Additionally, placement of sensor electrodes along the periphery 812 of the touch surface can operate to reduce capacitive response for those portions of the substrate having greater physical responsiveness (i.e., nearer to position value P4). For example, the change in capacitance plot 1010 indicates a relative valley of capacitive responsiveness near position value P4. Thus, the placement of sensor electrodes can "emphasize" the physical response of the substrate along the periphery 812 and "deemphasize" the physical response away from the periphery 812, such that a composite response plot 1015 for the substrate is more uniform across the entire substrate. A uniform (or more uniform) response allows force measurements to be easier to calibrate against force applied across the touch surface. Additionally, more uniform response simplifies the complexity of the location compensation submodule 1220 (FIG. 12), which is discussed below.

While the discussion of emphasizing the physical response of an edge-mounted substrate through placement of sensor electrodes along a periphery, the person of ordinary skill will recognize that the techniques discussed herein may be applied to substrates having areas of reduced physical responsiveness. For example, assume the substrate is coupled with a central support member at position value P4, such that the corresponding value of the substrate deflection plot 1005 is approximately zero at position value P4. In such a case, a sensor electrode may additionally or alternately be disposed within a range of position value P4 to enhance the physical response of the substrate.

Figure 11:
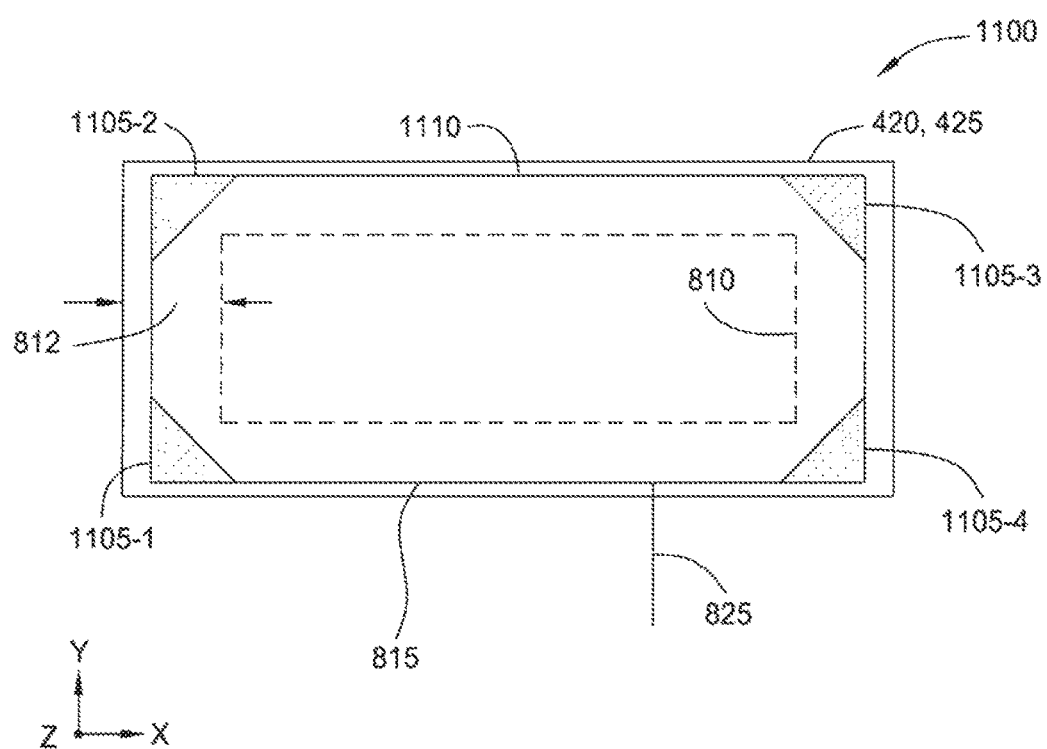
FIG. 11 illustrates an exemplary sensor electrode arrangement for a force sensor substrate, according to embodiments described herein.

FIG. 11 illustrates an exemplary sensor electrode arrangement for a force sensor substrate, according to embodiments described herein. In arrangement 1100, the first sensor electrode 815 is disposed along the periphery 812 of first surface 425. The first sensor electrode 815 comprises four shape portions 1105-1 through 1105-4 disposed in corners of the X-Y plane. The four shape portions 1105-1 through 1105-4 are connected using conductive traces 1110. The shape and/or size of the shape portions 1105-1 through 1105-4 are designed to provide a more linear force response across the first surface 425. As shown, the shape portions 1105-1 through 1105-4 are triangular in shape, but any suitable alternate shapes are possible. The first sensor electrode 815 is coupled to processing system using a conductive trace 825.

Figure 12:
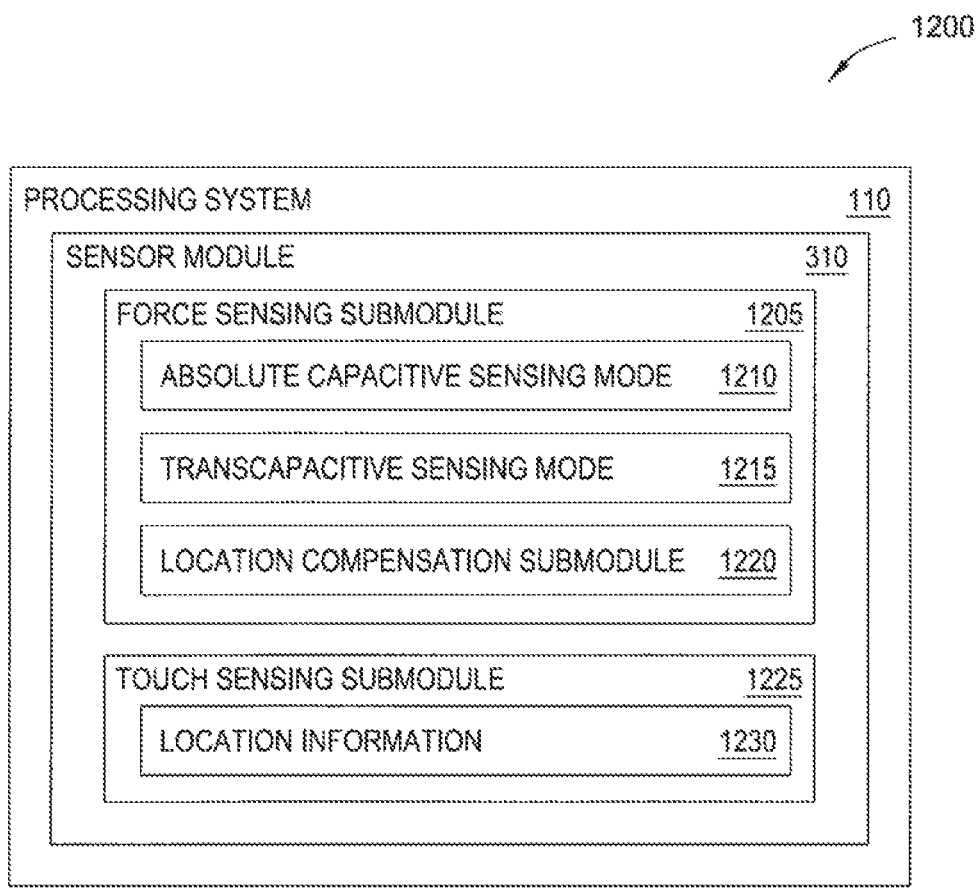
FIG. 12 illustrates an exemplary processing system coupled with a force sensor substrate, according to embodiments described herein.

FIG. 12 illustrates an exemplary processing system coupled with a force sensor substrate, according to embodiments described herein. In arrangement 1200, the sensor module 310 of processing system 110 comprises a force sensing submodule 1205 and a touch sensing submodule 1225 (or proximity sensing submodule). Each module and/or submodule may comprise circuitry that is a part of the processing system 110, firmware, software, or a combination thereof.

The force sensing submodule 1205 comprises a plurality of distinct modes of operation—absolute capacitive sensing mode 1210 and transcapacitive sensing mode 1215 (collectively, modes). Within the different modes, the force sensing submodule 1205 drives various coupled sensor electrodes with sensing signals, guard signals, shield signals, and so forth. The force sensing submodule 1205 may be further configured to couple sensor electrodes with a fixed voltage reference (e.g., ground) or electrically float the sensor electrodes. The force sensing submodule 1205 may select one of the modes and/or the particular configuration for driving sensor electrodes, e.g., based on measured noise. In other embodiments, the force sensing submodule is configured to perform only one of absolute capacitive sensing mode 1210 and transcapacitive sensing mode 1215.

The force sensing submodule 1205 further includes a location compensation submodule 1220. Referring back to FIG. 4, in response to force applied to the input surface, the bending response mode of the cover glass 420 is much more sensitive to pressure applied near the center of the input surface when compared with pressure applied towards the edges (i.e., near bezel member 405).

Returning to FIG. 12, force measurements may be correlated with location information 1230 acquired by a touch sensing submodule 1225 (or "touch sensing module") to improve force sensing performance in those less-sensitive regions of the input surface. For example, the force measurements can be zero-dimensional, representing an amount of force without any location information. In such a case, the force measurements alone cannot resolve multiple concurrent inputs. However, the touch sensing submodule 1225 can provide one-dimensional, two-dimensional, or three-dimensional input location Information 1230 that is correlated with the force measurements.

Figure 13:
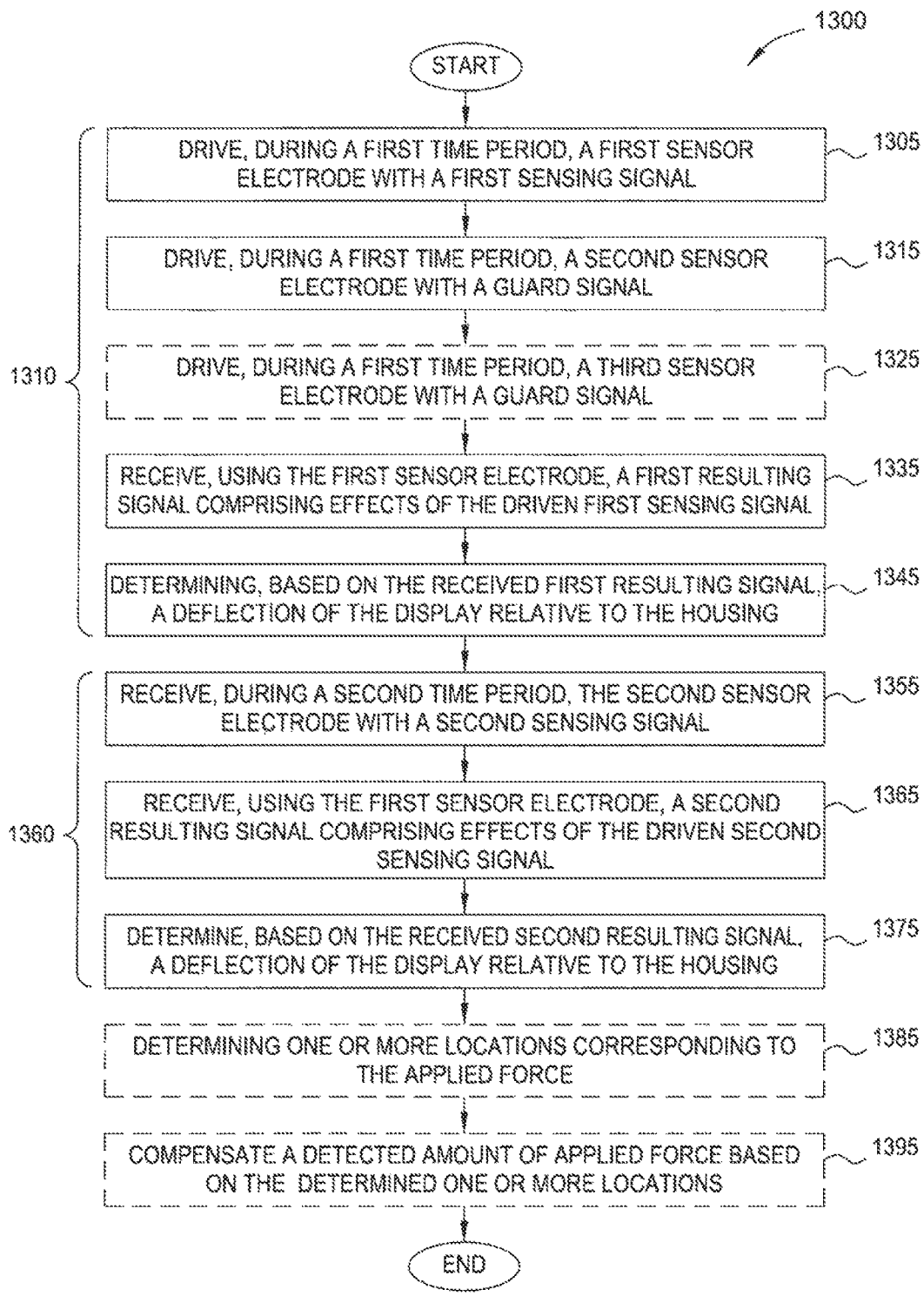
FIG. 13 illustrates a method of operating a force-sensitive input device comprising a force sensor substrate, according to embodiments described herein.

FIG. 13 illustrates a method of operating a force-sensitive input device comprising a force sensor substrate, according to embodiments described herein. Method 1300 is generally performed in conjunction with the various embodiments of processing system 110 and force sensor substrate 440 discussed herein.

Method 1300 begins at block 1305, where the processing system drives, during a first time period, a first sensor electrode with a first sensing signal. The first sensor electrode may be disposed along a periphery of an input surface of the input device. At block 1315, and during the first time period, the processing system drives a second sensor electrode with a guard signal. The second sensor electrode may also be disposed along the periphery, and may at least partly circumscribe the first sensor electrode in the first and second dimensions associated with the input surface. At block 1325, and during the first time period, the processing system optionally drives a third sensor electrode with a guard signal. The third sensor electrode may also be disposed along the periphery, and may at least partly circumscribe the first and second sensor electrodes in the first and second dimensions.

At block 1335, the processing system receives, using the first sensor electrode, a first resulting signal comprising effects of the driven first sensing signal. In some embodiments, the first resulting signal is used to determine changes in capacitance between sensor electrode(s) and a housing of the input device or other conductive layer. At block 1345, the processing system determines, based on the first resulting signal, a deflection of the display relative to the housing.

Generally, blocks 1305-1345 represent operation of the processing system in an absolute capacitive sensing mode 1310, and blocks 1355-1375 represent operation of the processing system in a transcapacitive sensing mode 1360. In some embodiments of method 1300, the processing system is configured to operate in each of absolute capacitive sensing mode 1310 and transcapacitive sensing mode 1360. However, in alternate embodiments, the processing system is configured to operate only in one of absolute capacitive sensing mode 1310 and transcapacitive sensing mode 1360. Further, the order of the blocks may be rearranged in any suitable order, e.g., the blocks of transcapacitive sensing mode 1360 are performed before the blocks absolute capacitive sensing mode 1110.

At block 1355, the processing system drives the second sensor electrode (here, operated as a transmitter electrode) with a second sensing signal. At block 1365, the processing system receives, using the first sensor electrode (operated as a receiver electrode), a second resulting signal comprising effects of the driven second sensing signal. At block 1375, the processing system determines, based on the received second resulting signal, a deflection of the display relative to the housing.

In some embodiments of method 1300, the processing system at block 1385 determines one or more locations corresponding to the applied force. This determination is typically performed using a proximity or touch sensing module. The processing system at block 1395 compensates a detected amount of applied force based on the determined one or more locations. The compensation generally flattens out the force sensitivity of the input device across the input surface. Blocks 1385 and 1395 may be performed in conjunction with one or both of the absolute capacitive sensing mode 1310 and transcapacitive sensing mode 1360, and may generally be performed at any suitable time. Method 1300 ends following completion of block 1395.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An input device, comprising:
  a display comprising a first substrate mounted to a housing, the first substrate defining a touch surface extending along first and second dimensions;
  a second substrate disposed within the housing on a side of the first substrate opposite the touch surface, the second substrate comprising:
    a first sensor electrode disposed along a periphery of the touch surface in the first and second dimensions; and
    a second sensor electrode disposed along the periphery of the touch surface and at least partly circumscribing the first sensor electrode in the first and second dimensions, wherein the first sensor electrode and the second sensor electrode spatially overlap an active area of the display; and
  a processing system configured to perform capacitive sensing using the first and second sensor electrodes to determine a deflection of the first substrate relative to the housing in response to force applied to the touch surface.

2. The input device of claim 1, wherein the second substrate is mounted to a non-touch surface of the first substrate opposite the touch surface, and wherein the capacitive sensing determines changes in capacitance between the housing and at least one of the first and second sensor electrodes.

3. The input device of claim 1, wherein the second substrate is mounted to the housing, and wherein the capacitive sensing determines changes in capacitance between a conductive layer of the first substrate and at least one of the first and second sensor electrodes.

4. The input device of claim 3, wherein the conductive layer of the first substrate comprises a common electrode layer used for updating the display.

5. The input device of claim 1, wherein the processing system is configured to perform absolute capacitive sensing and transcapacitive sensing using the first and second sensor electrodes,
  wherein performing absolute capacitive sensing comprises operating the first sensor electrode as a receiver electrode and operating the second sensor electrode as a guard electrode, and
  wherein performing transcapacitive sensing comprises operating the first sensor electrode as a receiver electrode and operating the second sensor electrode as a transmitter electrode.

6. The input device of claim 5, wherein the second substrate further comprises:
  a third sensor electrode disposed along the periphery of the touch surface and circumscribed by the first and second sensor electrodes in the first and second dimensions, and
  wherein the processing system is further configured to operate the third sensor electrode as a guard electrode.

7. The input device of claim 1, wherein the first sensor electrode is disposed on a first layer of the second substrate and the second sensor electrode is disposed on a second layer of the second substrate, wherein the second sensor electrode entirely circumscribes the first sensor electrode in the first and second dimensions.

8. A method of operating a force-sensitive input device comprising a substrate disposed on a non-viewing side of a display, the display mounted to a housing and having a first surface extending along first and second dimensions, the method comprising:
  driving, during a first time period, a first sensor electrode of the substrate with a first sensing signal, the first sensor electrode disposed along a periphery of the first surface in the first and second dimensions;
  driving, during the first time period, a second sensor electrode of the substrate with a guard signal, the second sensor electrode disposed along the periphery of the first surface and at least partly circumscribing the first sensor electrode in the first and second dimensions, wherein the first sensor electrode and the second sensor electrode spatially overlap an active area of the display;
  receiving, using the first sensor electrode, a first resulting signal comprising effects of the driven first sensing signal and effects of a first deflection of the display relative to the housing;
  determining, based on the received first resulting signal, a first force applied to the first surface; and
  performing, using the display, a first user interface action based on the first force.

9. The method of claim 8, further comprising:
  driving, during a second time period, the second sensor electrode with a second sensing signal;
  receiving, using the first sensor electrode, a second resulting signal comprising effects of the driven second sensing signal and effects of a second deflection of the display relative to the housing;
  determining, based on the received second resulting signal, a second force applied to the first surface; and
  performing, using the display, a second user interface action based on the second force.

10. The method of claim 8, further comprising:
  driving, during the first time period, a third sensor electrode of the substrate with a guard signal, the third sensor electrode disposed along the periphery of the first surface and circumscribed by the first and second sensor electrodes in the first and second dimensions.

11. The method of claim 8, wherein the substrate is mounted to a second surface of the display opposite the first surface, and wherein determining a first force applied to the first surface comprises:
  determining a change in capacitance between the housing and the first sensor electrode.

12. The method of claim 8, wherein the substrate is mounted to the housing, and wherein determining a first force applied to the first surface comprises:
  determining a change in capacitance between a conductive layer of the display and the first sensor electrode.

13. The method of claim 12, wherein the conductive layer of the display comprises a common electrode layer used for updating the display.

14. The method of claim 8, further comprising:
  determining one or more locations corresponding to the first force applied to the first surface; and
  compensating a detected amount of the first force applied to the first surface based on the determined one or more locations.

15. A processing system for a force-sensitive input device comprising a substrate disposed on a non-viewing side of a display, the display mounted to a housing and having a first surface extending along first and second dimensions, the processing system comprising:
  first circuitry communicatively coupled with first and second sensor electrodes of the substrate, wherein the first circuitry is configured to:
    drive, during a first time period, the first sensor electrode with a first sensing signal, the first sensor electrode disposed along a periphery of the first surface in the first and second dimensions;
    drive, during the first time period, the second sensor electrode with a guard signal, the second sensor electrode disposed along the periphery of the first surface and at least partly circumscribing the first sensor electrode in the first and second dimensions, wherein the first sensor electrode and the second sensor electrode spatially overlap an active area of the display;
    receive, using the first sensor electrode, a first resulting signal comprising effects of the driven first sensing signal and effects of a first deflection of the display relative to the housing;
    determine, based on the received first resulting signal, a first force applied to the first surface; and
    perform, using the display, a first user interface action based on the first force.

16. The processing system of claim 15, wherein the first circuitry is further configured to:
  drive, during a second time period, the second sensor electrode with a second sensing signal;
  receive, using the first sensor electrode, a second resulting signal comprising effects of the driven second sensing signal and effects of a second deflection of the display relative to the housing;
  determine, based on the received second resulting signal, a second force applied to the first surface; and
  perform, using the display, a second user interface action based on the second force.

17. The processing system of claim 15, wherein the first circuitry is further configured to:
  drive, during the first time period, a third sensor electrode of the substrate with a guard signal, the third sensor electrode disposed along the periphery of the first surface and circumscribed by the first and second sensor electrodes in the first and second dimensions.

18. The processing system of claim 15, wherein the substrate is mounted to a second surface of the display opposite the first surface, and wherein determining a first force applied to the first surface comprises:
  determining a change in capacitance between the housing and the first sensor electrode.

19. The processing system of claim 15, wherein the substrate is mounted to the housing, and wherein determining a first force applied to the first surface comprises:
  determining a change in capacitance between a conductive layer of the display and the first sensor electrode.

20. The processing system of claim 19, wherein the conductive layer of the display comprises a common electrode layer used for updating the display.

21. The processing system of claim 15, further comprising:
  second circuitry communicatively coupled with a plurality of sensor electrodes of the input device, wherein the second circuitry is configured to:
    determine, based on signals received from the plurality of sensor electrodes, one or more locations corresponding to the first force applied to the first surface,
  wherein the first circuitry is further configured to compensate a detected amount of the first force applied to the first surface based on the determined one or more locations.

* * * * *